(12) United States Patent
Briggs

(10) Patent No.: US 11,298,754 B1
(45) Date of Patent: Apr. 12, 2022

(54) MODE I FRACTURE TESTING FIXTURE

(71) Applicant: National Technology & Engineering Solutions of Sandia, LLC, Albuquerque, NM (US)

(72) Inventor: Timothy Briggs, Brentwood, CA (US)

(73) Assignee: National Technology & Engineering Solutions of Sandia, LLC, Albuquerque, NM (US)

(*) Notice: Subject to any disclaimer, the term of this patent is extended or adjusted under 35 U.S.C. 154(b) by 15 days.

(21) Appl. No.: 16/878,731

(22) Filed: May 20, 2020

(51) Int. Cl.
B23B 47/28 (2006.01)
G01M 5/00 (2006.01)
G01N 3/08 (2006.01)

(52) U.S. Cl.
CPC ......... *B23B 47/288* (2013.01); *G01M 5/0033* (2013.01); *G01N 3/08* (2013.01)

(58) Field of Classification Search
CPC ...... B23B 47/288; G01M 5/0033; G01N 3/08
See application file for complete search history.

(56) References Cited

U.S. PATENT DOCUMENTS

| 4,474,514 | A | * | 10/1984 | Jensen | B23B 47/287 408/115 B |
| 5,317,925 | A | * | 6/1994 | Hayashi | G01N 3/08 422/53 |
| 8,205,506 | B2 | * | 6/2012 | Costa Balanzat | G01N 3/04 73/860 |
| 2011/0283850 | A1 | * | 11/2011 | Tabb | B26D 7/01 83/13 |

FOREIGN PATENT DOCUMENTS

EP 0763641 B1 * 8/1999 ............... E05C 9/10

OTHER PUBLICATIONS

Machine translation of EP 0763641 B1 (Year: 1999).*
Standard Test Method for Mode I Interlaminar Fracture Toughness of Unidirectional Fiber-Reinforced Polymer Matrix Composites, ASTM International, West Conshohocken, PA, 2020, 13 pages.

* cited by examiner

Primary Examiner — Patrick Assouad
Assistant Examiner — Sangkyung Lee
(74) Attorney, Agent, or Firm — Madelynne J. Farber; Mark A. Dodd

(57) ABSTRACT

An apparatus and method for preparing Double Cantilever Beam (DCB) specimens are disclosed as an apparatus and method for conducting Mode I fracture resistance testing using the DCB specimens. In a first embodiment, a drill jig is used to locate the DCB specimen and guide a drilling process during creation of at least one through-hole in the DCB specimen. The drilling process may employ a traditional drill and drill bit, a laser drill, or a water jet. In another embodiment, a set of rotating pin blocks, each with a full-round or a half-round specimen pin at one end and a hanger full-round pin at the other end, engage the DCB specimen and facilitate the internal application of a fracturing load to the DCB specimen for the Mode I fracture resistance test. The present invention may significantly reduce the time and materials needed to prepare and test a DCB specimen.

7 Claims, 5 Drawing Sheets

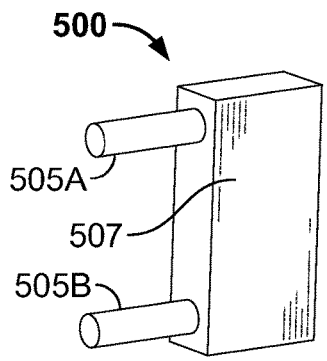
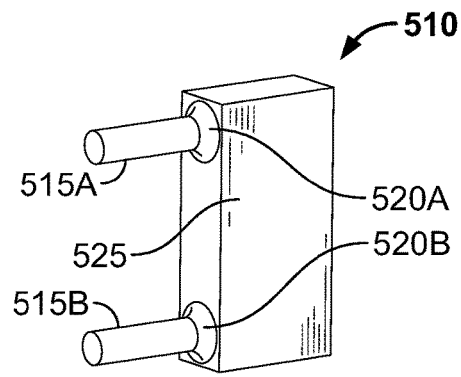
FIG. 5A     FIG. 5B
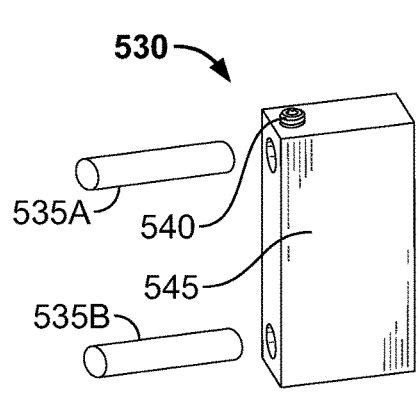
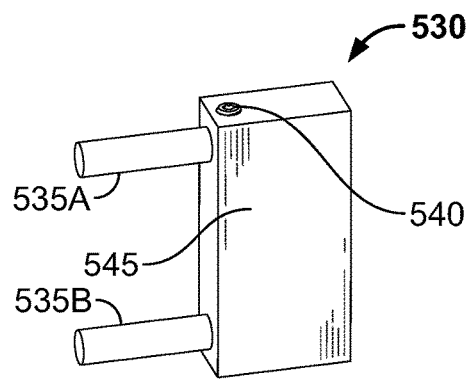
FIG. 5C     FIG. 5D
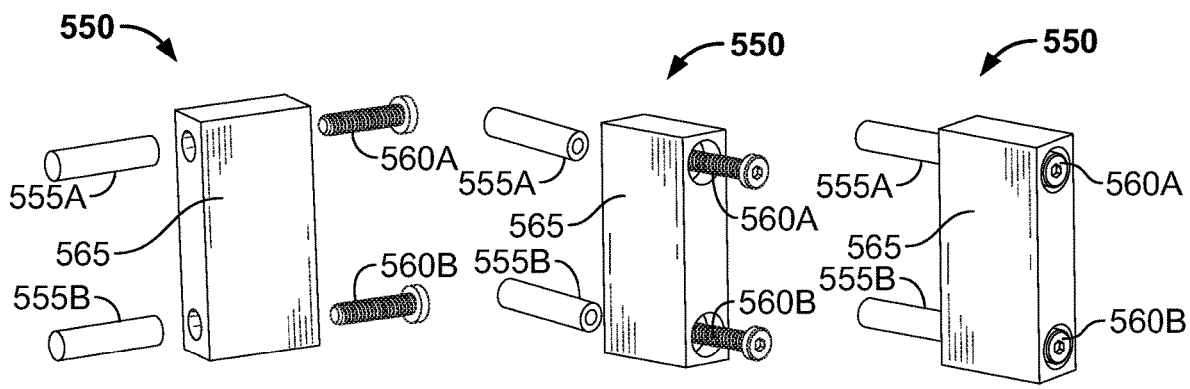
FIG. 5E     FIG. 5F     FIG. 5G

MODE I FRACTURE TESTING FIXTURE

STATEMENT OF GOVERNMENT INTEREST

This invention was made with Government support under Contract No. DE-NA0003525 awarded by the United States Department of Energy/National Nuclear Security Administration. The Government has certain rights in the invention.

TECHNICAL FIELD

The present invention relates to apparatuses and methods for creating test specimens and conducting Mode I fracture testing of materials, such as laminated composites, using a double cantilever beam approach.

BACKGROUND

In the field of structural mechanics, there exists a community of researchers investigating fracture mechanics and fracture properties of materials. This is a critical area of research that drives material selection and design consideration for virtually all structural components spanning fields of recreation, infrastructure, transportation, energy, aerospace, safety, etc. One of the most critical parameters to characterize for a material or a combination of bonded materials is the Mode I fracture toughness—an out-of-plane peeling-type of load application that generally exacerbates the material's resistance to damage nucleation and growth. Experimental testing of adhesives, laminated composites, bi-material configurations, etc., are often pursued utilizing the Double Cantilever Beam (DCB) approach to measure this Mode I fracture resistance. For laminated composites, ASTM D5528-13 governs the approach and is widely recognized as the standard of choice to follow. See "ASTM D5528-13: Standard Test Method for Mode I Interlaminar Fracture Toughness of Unidirectional Fiber-Reinforced Polymer Matrix Composites," ASTM International (2013), the contents of which are incorporated herein by reference. The testing approach is performed using a mechanical load application from a testing frame that is communicated through either bonded hinges or bonded loading blocks, with the former being more common. The act of preparing the specimens and hinges (or loading blocks) and then performing the bonding operation is extremely time-intensive and very expensive, even before any testing has begun.

The following is a general description of the time-intensive and expensive process used to prepare specimens for DCB testing. DCB specimens are typically cut from a cured composite panel using either an abrasive water jet or a wet diamond saw. DCB specimens are removed from the panel and individual hinges are each cut to an appropriate size considering the specimen width. The DCB specimens are prepared on each of their bonding surfaces, which often includes a light abrasion with a volatile solvent cleaning to remove contaminants from the bond line region. The hinges are then prepared on their bonding faces, which may be similar to the DCB specimens, but could also include more intensive cleaning practices such as using degreasers or chemical etching. A custom bonding jig is then used to locate a series of hinges in place and then a layer of prepared and mixed adhesive is applied by hand to each bonding face on the hinge. A mask is cut and used to protect the DCB specimen from adhesive leaking beyond the hinge region during the bonding process along the specimen length or onto the specimen edges and to help elevate the specimen to the same height as the hinge leaf thickness.

Adhesive is applied to the bonding face on the DCB specimen and the specimen is located in the jig along its sides while being indexed lengthwise until it lines up parallel with a first hinge. The DCB specimen is then clamped together for a sufficient time based on the adhesive used. This process bonds the first hinge to a first face of the DCB specimen. The procedure is then repeated, after a sufficient time so the adhesive cures, in order to bond a second hinge parallel to a second face of the DCB specimen as well as being aligned to the first hinge. Finally, there is usually some adhesive spill-out, for example, along the edges, that may need to be cleaned up before fracture testing is performed. Following this procedure, a completed set of DCB specimens, typically five or six to a set, takes approximately a week to fully prepare.

The following is a general description of the ASTM DCB test using the prepared DCB specimens. A DCB testing fixture connects to the hinges to apply the fracturing load during testing. A typical DCB testing experiment fractures the DCB specimen due to the applied fracturing load, with the hinges allowing free rotation of the specimen as an interlaminar delamination crack advances along the length of the specimen. The fracturing load opens the interlaminar delamination crack in the horizontal direction, typically along the interlaminar interface of the DCB specimen. The hinges rotate to keep the applied fracturing load in the vertical direction. The fracturing load is applied to further open the interlaminar delamination crack and drive the delamination horizontally along the length of the DCB specimen while recording the incremental growth of the interlaminar delamination crack.

The applied fracturing load, P, versus the interlaminar delamination crack length, $\alpha$, is recorded during testing. These values are used to calculate the strain energy release rate, G, of the material system being tested, in accordance with the following equation:

$$G = -\frac{1}{b}\frac{dU}{da},$$

where b is the width of the DCB specimen, U is the total elastic energy in the DCB specimen, and a is the delamination length. Fractography is then performed to determine the mode of failure that governs the fracture toughness.

Due to the time-intensive and expensive DCB specimen preparation process, the need exists for a faster and less expensive method for preparing specimens.

SUMMARY

One aspect of the present invention relates to a faster and less expensive method and corresponding drill jig for preparing DCB specimens. Another aspect of the present invention relates to a fixture for conducting the DCB test itself.

In at least one embodiment of the present invention, a drill jig is used to precisely locate the DCB specimen and guide a drill bit during the drilling of one or more holes through the specimen. In another embodiment of the present invention, a set of rotating pin blocks, each with a specimen pin at one end and a hanger full-round pin at the other end, engage the DCB specimen and connect to pin block hangers that are used to apply the fracturing load.

The improved DCB specimen preparation method and corresponding drill jig offer the following advantages over the traditional specimen preparation method: 1. DCB specimens no longer require hand sanding or volatile solvent cleaning to prepare for bonding hinges. 2. Hinges no longer need to be procured and individually cut to size, nor hand sanded and volatile solvent cleaned. 3. No fixturing is needed to locate hinges with respect to the DCB specimens or themselves. 4. No adhesive needs to be procured, mixed, and applied to both the hinges and the DCB specimens. 5. DCB specimens will no longer require approximately 1 week to be ready for testing, which was the time required for bonding the hinges and allowing the adhesive to cure in the traditional method of preparing DCB specimens.

The DCB test in accordance with various embodiments of the present invention internally applies the fracturing load to the DCB specimen via rotating pin blocks. This offers several advantages over the traditional DCB test: 1. The present invention eliminates a potential undesirable point of fracture—the bond line between the hinges or load blocks and the DCB specimen. 2. The internal application of the fracturing load eliminates the need to generate one or more of the correction factors unique to hinges or loading blocks discussed in Annex A1 of ASTM D5528-13. 3. While offering several benefits over the traditional DCB test, much of the test equipment used in the traditional DCB test is also used with the present invention, thus no major new investment is required to implement various embodiments of the present invention.

In at least one embodiment of the present invention, a drill jig for preparing a Double Cantilever Beam (DCB) specimen comprises a body (for holding the DCB specimen), at least one clamp (for fixing a position of the DCB specimen within the body), a bit guide block (for guiding a drill bit), and at least one linear adjuster (the linear adjuster(s) coupled to the body and the bit guide block, the linear adjuster(s) for placing the bit guide block in at least one predetermined position relative to the body); the at least one linear adjuster includes two linear adjusters moving in two corresponding orthogonal directions; the at least one linear adjuster includes three linear adjusters moving in three corresponding orthogonal directions; and wherein the at least one predetermined position includes one predetermined position (aligned with a laminar interface between first and second joined adherend layers that form the DCB specimen), or wherein the at least one predetermined position includes two predetermined positions (a first predetermined position substantially a distance d from the laminar interface in the first joined adherend layer, and a second predetermined position being substantially a distance d from the laminar interface in the second joined adherend layer).

In at least one embodiment of the present invention, a test fixture for conducting a Double Cantilever Beam (DCB) test comprises upper and lower pin block hangers (for receiving an applied fracturing load), and at least two rotating pin blocks (each rotating pin block including a specimen pin and a hanger full-round pin, each specimen pin substantially parallel to a corresponding full-round pin, each hanger full-round pin for rotationally mechanically coupling to a corresponding one of the upper and lower pin block hangers, each specimen pin for rotationally mechanically coupling to a DCB specimen), wherein the applied fracturing load is transferred from the upper and lower pin block hangers to the DCB specimen via the at least two rotating pin blocks.

In various embodiments of the test fixture: each specimen pin is a specimen half-round pin or a specimen full-round pin; if the specimen pin is a specimen half-round pin, a flat surface of a half-round pin of a first of the at least two rotating pin blocks faces a corresponding flat surface of an opposing half-round pin of a second of the at least two rotating pin blocks; and a specimen pin of a first of the at least two rotating pin blocks rotationally mechanically couples to a first of two holes in the DCB specimen, and a specimen pin of a second of the at least two rotating pin blocks rotationally mechanically couples to a second of two holes in the DCB specimen.

In yet other embodiments of the test fixture: the at least two rotating pin blocks includes four rotating pin blocks, an end of a specimen pin or a hanger full-round pin of each of the four rotating pin blocks includes a portion of an interlocking feature, and the portion of the interlocking feature of a first of the four rotating pin blocks fixedly mechanically couples with the portion of the interlocking feature of a second of the four rotating pin blocks; the interlocking feature includes one of a rod and corresponding recess, a tab and corresponding slot, and meshing teeth; and each specimen pin and each hanger full-round pin of each of the at least two rotating pin blocks is fixedly or removably attached to a body of a corresponding one of the at least two rotating pin blocks.

In at least one embodiment of the present invention, a method for conducting a Double Cantilever Beam (DCB) test comprises the steps of providing upper and lower pin block hangers, providing at least two rotating pin blocks (each rotating pin block including a specimen pin and a hanger full-round pin, each specimen pin substantially parallel to a corresponding hanger full-round pin), providing a DCB specimen having at least one hole therethrough, rotationally mechanically coupling each hanger full-round pin of each of the at least two rotating pin blocks to a corresponding one of the upper and lower pin block hangers, rotationally mechanically coupling each specimen pin of each of the at least two rotating pin blocks to the DCB specimen via the at least one hole in the DCB specimen, applying a fracturing load to the DCB specimen via the at least two rotating pin blocks and the upper and lower pin block hangers, recording the applied fracturing load as a function of time, recording an interlaminar delamination crack length as a function of time, and calculating the strain energy release rate of the DCB specimen based upon the recorded applied fracturing load and the recorded interlaminar delamination crack length.

In various embodiments of the DCB test method: the method further comprises performing fractography; each specimen pin of each of the at least two rotating pin blocks is a specimen half-round pin or a specimen full-round pin; if the specimen pin is a specimen half-round pin, a flat surface of a specimen half-round pin of a first of the at least two rotating pin blocks faces a corresponding flat surface of an opposing specimen half-round pin of a second of the at least two rotating pin blocks; and a specimen pin of a first of the at least two rotating pin blocks rotationally mechanically couples to a first of the at least one hole in the DCB specimen, and a specimen pin of a second of the at least two rotating pin blocks rotationally mechanically couples to a second of the at least one hole in the DCB specimen.

In yet other embodiments of the DCB test method: the at least two rotating pin blocks includes four rotating pin blocks, an end of a specimen pin or a hanger full-round pin of each of the four rotating pin blocks includes a portion of an interlocking feature; and the portion of the interlocking feature of a first of the four rotating pin blocks fixedly mechanically couples with the portion of the interlocking feature of a second of the four rotating pin blocks; the interlocking feature includes one of a rod and corresponding recess, a tab and corresponding slot, and meshing teeth; and each specimen pin and each hanger full-round pin of each of the at least two rotating pin blocks is fixedly or removably attached to a body of a corresponding one of the at least two rotating pin blocks.

In still other embodiments of the DCB test method: the method further comprises preparing the DCB specimen, the step of preparing the DCB specimen including the steps of locating the DCB specimen within a drill jig, aligning a drill with the DCB specimen at at least one predetermined position, wherein the at least one predetermined position includes one predetermined position (aligned with a laminar interface between first and second joined adherend layers that form the DCB specimen) or includes two predetermined positions (a first predetermined position being substantially a distance d from the laminar interface in the first joined adherend layer, and a second predetermined position being substantially the distance d from the laminar interface in the second joined adherend layer), and drilling the at least one hole through the DCB specimen at the at least one predetermined position.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the invention, wherein identical reference numerals refer to identical or similar elements or features in different views or embodiments shown in the drawings. The drawings are not to scale and are intended only to illustrate the elements of various embodiments of the present invention.

FIGS. 5A-5G illustrate rotating pin blocks in accordance with various embodiments of the present invention.

DETAILED DESCRIPTION

DCB Specimen Preparation

Figure 1:
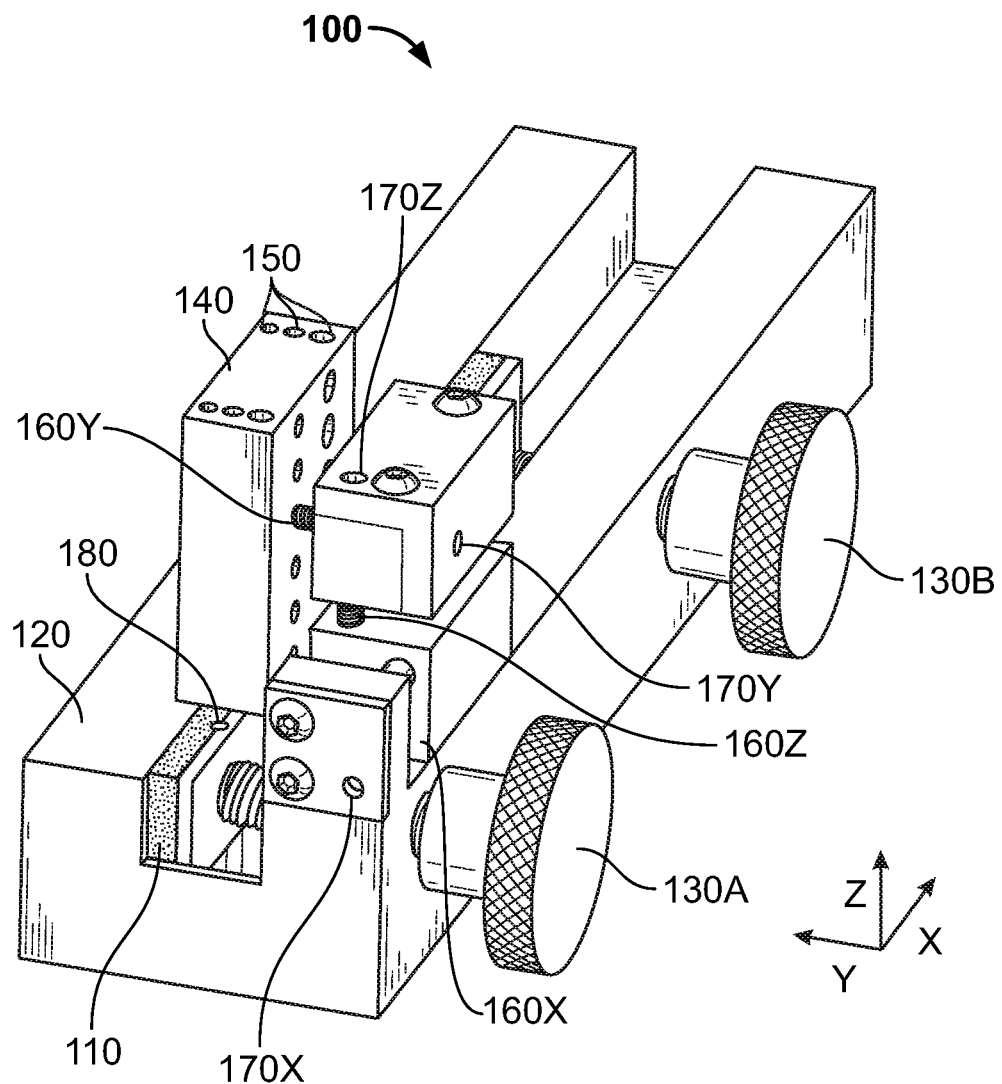
FIG. 1 illustrates a drill jig in accordance with one or more embodiments of the present invention.

A drill jig 100, in accordance with at least one embodiment of the present invention, is illustrated in FIG. 1. A DCB specimen 110 is inserted into a body 120 of the drill jig 100 and clamped into place using two clamps 130A, 130B. A bit guide block 140, having one or more holes 150 for guiding a drill bit (not illustrated) is positioned using three linear adjusters 160X, 160Y, 160Z. The three linear adjusters 160X, 160Y, 160Z allow precise and repeatable positioning of the bit guide block 140 in all three orthogonal directions. The three linear adjusters 160X, 160Y, 160Z employ captive screws 170X, 170Y, 170Z to adjust the locations of the respective linear adjusters 160X, 160Y, 160Z. Once the bit guide block 140 is in the desired location, it guides a drill bit such that a hole 180 may be drilled in the desired location in the DCB specimen 110.

While the illustrated drill jig 100 uses three linear adjusters 160X, 160Y, 160Z, in other embodiments of the present invention, only one or two linear adjusters are employed. For example, if all DCB specimens 110 will have the same width, then only two linear adjusters 160X, 160Y may be required for motion in two orthogonal directions X and Y. As yet another example, if all DCB specimens 110 will have the same width and a stop is included in the body 110 to place the end of the DCB specimens 110 at the same place, then only one linear adjuster 160Y may be required for motion in the Y direction to permit DCB specimens 110 having their laminar interfaces at different thicknesses.

While the illustrated drill jig 100 uses captive screws 170X, 170Y, 170Z to adjust the locations of the respective linear adjusters 160X, 160Y, 160Z, in other embodiments of the present invention, the locations are adjusted using micrometers, which can allow precise positioning of the linear adjusters 160X, 160Y, 160Z. In yet other embodiments of the present invention, the position of the bit guide block 140 is adjusted automatically using an optical, magnetic, electrical, or mechanical system for detecting and adjusting the position of the bit guide block 140 in conjunction with high-resolution computer numerical control. Regardless of the type of linear adjusters used, the goal is the same—to accurately locate the bit guide block 140 so that the hole 180 will be located at the correct position within the DCB specimen 110.

While the illustrated drill jig 100 uses a bit guide block 140 to guide the drill bit used to form the hole 180 within the DCB specimen 110, the hole 180 may be formed using other techniques in other embodiments of the present invention. For example, the hole 180 may be formed using a laser drill, with pulses of laser light, or a water jet, with a high-pressure water jet that may be pulsed and/or to which an abrasive has been added to the water.

Figure 2A:
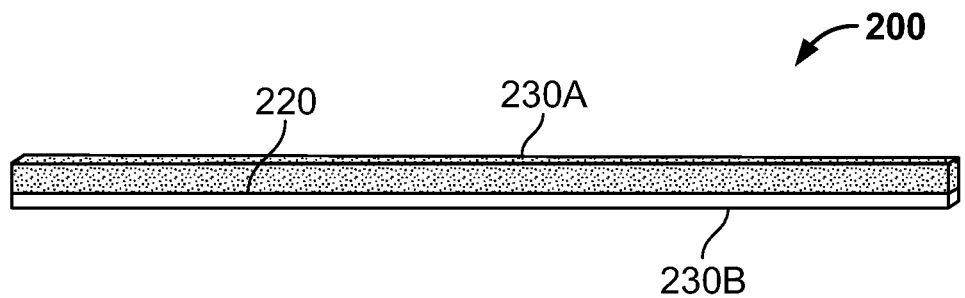
FIGS. 2A and 2B illustrate a DCB specimen before and after a hole has been drilled using a drill jig in accordance with one or more embodiments of the present invention.
Figure 2B:
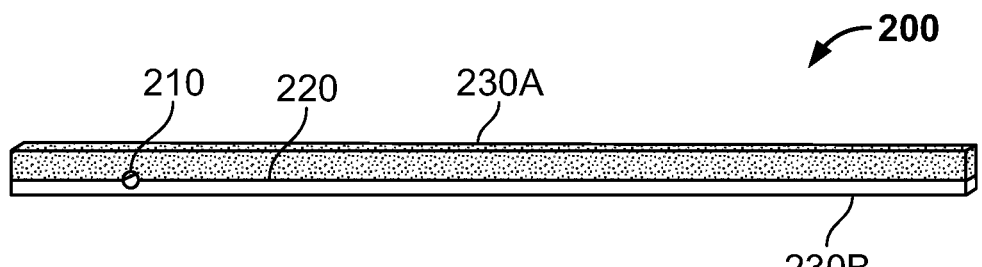

FIGS. 2A and 2B illustrate a DCB specimen 200 before and after a hole 210 has been drilled using an embodiment of the present invention. The hole 210 is located at a laminar (or bi-material) interface 220 between two joined adherend layers 230A, 230B, with the intended interlaminar delamination crack path located along the laminar interface 220.

While the DCB specimen 200 illustrated in FIGS. 2A and 2B includes a single hole formed at the laminar interface 220, other embodiments of the present invention employ two holes in the DCB specimen 200. For example, if the two joined adherend layers 230A, 230B are sufficiently thick, two holes are drilled, with one in each of the joined adherend layers 230A, 230B. The two holes would preferably be mirror images of each other in that both are the same distance from the end of the DCB specimen 200 and are the same distance d from the laminar interface 220. The two joined adherend layers 230A, 230B are sufficiently thick for this embodiment of the present invention when, for example, bearing shear failure within the two joined adherend layers 230A, 230B would not allow a specimen pin (discussed below) to shear plug out of the DCB specimen 200.

Figure 3:
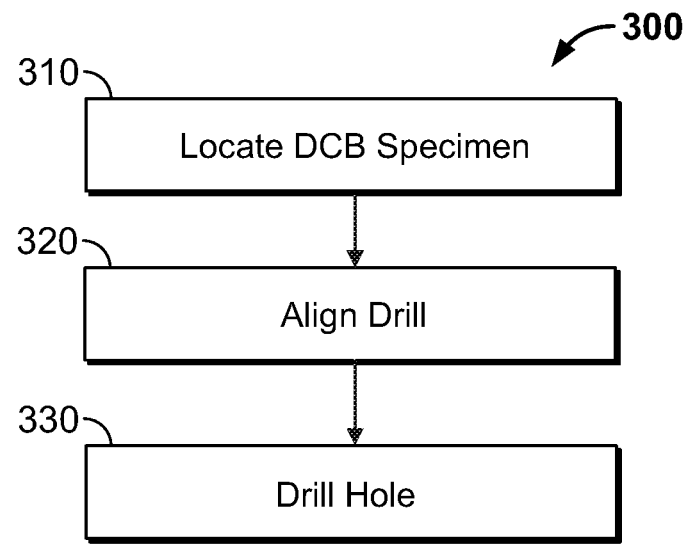
FIG. 3 illustrates a flowchart with the steps required to prepare a DCB specimen in accordance with one or more embodiments of the present invention.

FIG. 3 illustrates a flowchart 300 with the steps required to prepare a DCB specimen in accordance with at least one embodiment of the present invention. In step 310, the DCB specimen is located within a drill jig. In step 320, a drill is precisely aligned with the DCB specimen so that a resultant hole will be at the desired location, typically the laminar interface of the specimen when only a single hole is required. As described above, step 320 may, for example, be implemented using captive screws acting upon the linear adjusters; be implemented using micrometers acting upon the linear adjusters; or be implemented using an automated system that is computer numerically controlled and motor driven. In step 330, the hole is drilled in the desired location. As described above, step 330 may, for example, be implemented using a drill and corresponding drill bit; be implemented using a laser drill; or be implemented using a water jet. As also described above, the DCB specimen may include two holes, one in each joined adherend layer, rather than just a single hole at the laminar interface of the specimen.

As will be appreciated, the order of the above steps may be altered, various steps may be combined, and one or more steps may be added or deleted depending upon the specific embodiment of the present invention.

DCB Test Fixture

Figure 4A:
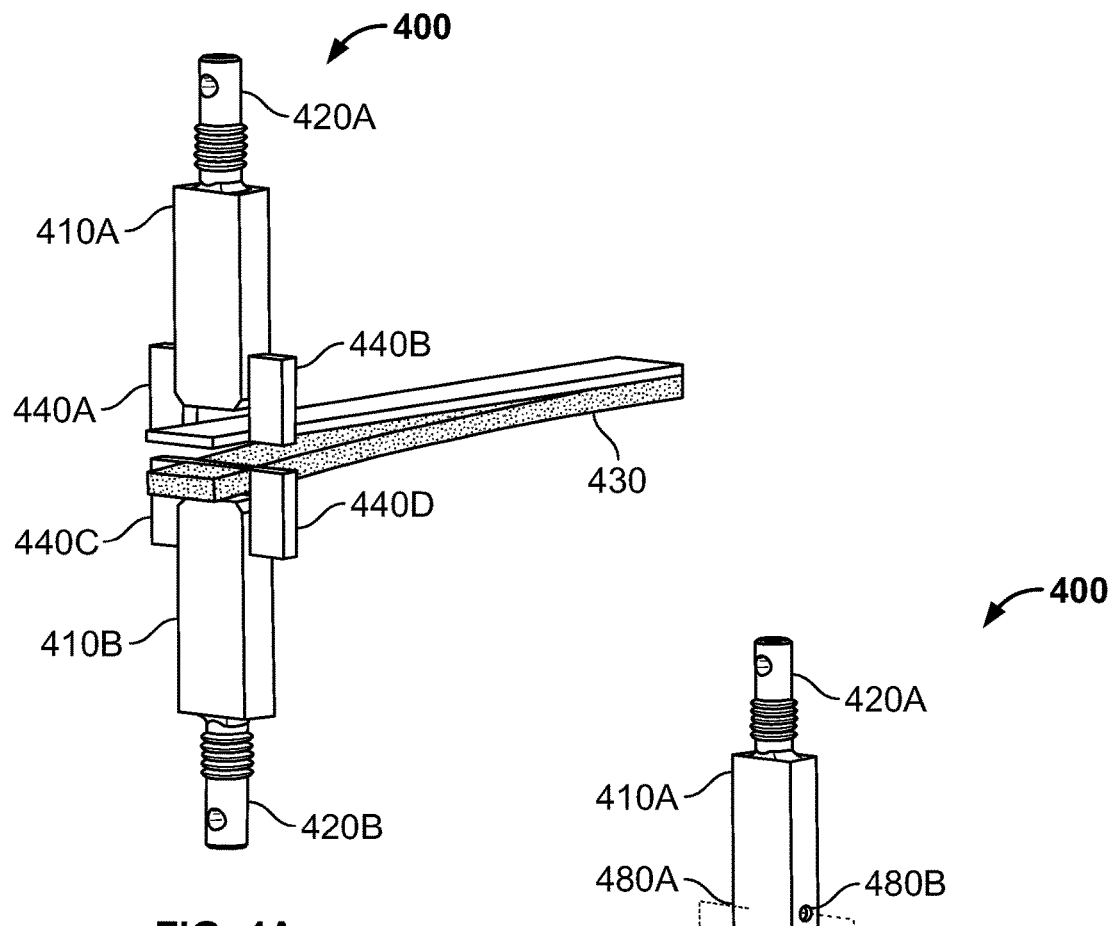
FIGS. 4A-4C illustrate a test fixture in accordance with one or more embodiments of the present invention.
Figure 4B:
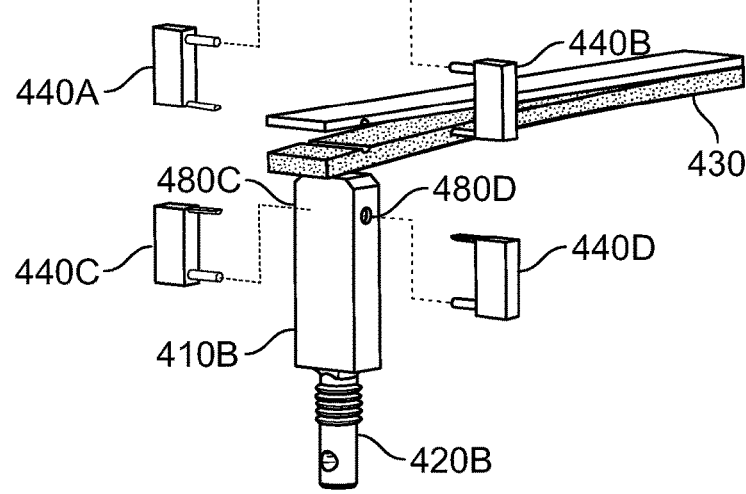
Figure 4C:
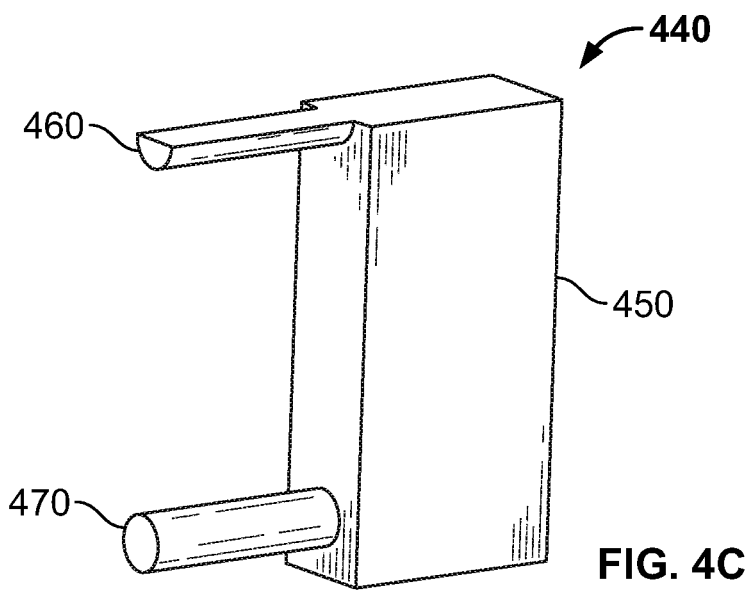

FIGS. 4A-4C illustrate a test fixture 400 in accordance with at least one embodiment of the present invention. The overall test fixture 400 is illustrated in FIG. 4A and includes upper and lower pin block hangers 410A, 410B mechanically coupled to respective upper and lower load rods 420A, 420B, which supply the fracturing load applied to the DCB specimen 430. The upper and lower pin block hangers 410A, 410B are coupled to the DCB specimen 430 via a set of four rotating pin blocks 440A-440D, as illustrated in FIG. 4B. FIG. 4C illustrates the details of the rotating pin blocks 440A-440D, including a body 450, a specimen half-round pin 460, and a hanger full-round pin 470, with the specimen half-round pin 460 being substantially parallel to the hanger full-round pin 470. During DCB testing, the hanger full-round pin 470 of each rotating pin block 440A-440D is rotationally mechanically coupled to the upper and lower pin block hangers 410A, 410B via a corresponding hole 480A-D in the upper and lower pin block hangers 410A, 410B. During DCB testing, the specimen half-round pin 460 of each rotating pin block 440A-440D is in a hole in the DCB specimen 430, with a flat surface of each specimen half-round pin 460 facing a corresponding flat surface of an opposing specimen half-round pin 460. The rotational motion of the hanger full-round pin 470 and the specimen half-round pin 460 of each rotating pin block 440A-440D allows the fracturing load applied to the DCB specimen 430 to remain in the vertical direction, regardless of the length of the interlaminar delamination crack, much like the hinges did in the prior art DCB testing methodology.

While the illustrated test fixture 400 includes four rotating pin blocks 440A-440D, in other embodiments of the present invention, only two rotating pin blocks may be employed. In these embodiments of the present invention, the specimen half-round pins 460 extend all the way through the hole in the DCB specimen 430, as opposed to only half way through when four rotating pin blocks 440A-440D are employed. The use of only two rotating pin blocks 440 is preferably limited to those applications in which the applied fracturing load is constrained such that the stress state remains elastic in the specimen half-round pin 460 and the hanger full-round pin 470.

While the illustrated rotating pin blocks 440A-440D have flat ends on both the specimen half-round pin 460 and the hanger full-round pin 470, in other embodiments of the present invention, the ends may include features to interlock with the ends on opposing rotating pin blocks 440A-440D. In these embodiments of the present invention, the specimen half-round pin 460 and/or the hanger full-round pin 470 of rotating pin block 440A may, for example, include a short rod on its end that engages a corresponding recess in the opposing end of the specimen half-round pin 460 and/or the hanger full-round pin 470 of rotating pin block 440B. Alternative interlocking features include, for example, tabs with corresponding slots, and meshing teeth. These interlocking features provide fixed mechanical coupling between opposing specimen half-round pins 460 and/or hanger full-round pins 470, thereby permitting the application of a more uniform fracturing load across the length of the hole in the DCB specimen 430.

While the embodiment illustrated in FIGS. 4A-4C employs rotating pin blocks 440A-440D having specimen half-round pins 460 as the DCB specimen 430 has a single hole, other embodiments may employ rotating pin blocks having both a specimen full-round pin and a hanger full-round pin as the DCB specimen has two holes. FIGS. 5A-5G illustrate various rotating pin blocks in accordance with these additional embodiments of the present invention. The use of specimen half-round pins 460 is preferably limited to those applications in which the applied fracturing load is constrained such that the stress state remains elastic in the specimen half-round pin 460. The use of a specimen full-round pin may permit the application of a correspondingly higher fracturing load, but is preferably still constrained such that the stress state remains elastic in the specimen full-round pin.

FIG. 5A illustrates a rotating pin block 500 with specimen and hanger full-round pins 505A, 505B without fillets, while FIG. 5B illustrates a rotating pin block 510 with specimen and hanger full-round pins 515A, 515B with corresponding fillets 520A, 520B. The rotating pin block 510 with fillets 520A, 520B has the benefit that it will have less stress concentration than the rotating pin block 500 without fillets. In both rotating pin blocks 500, 510, the specimen and hanger full-round pins 505A, 505B, 515A, 515B, are fixedly attached to their corresponding bodies 507, 525.

FIGS. 5C and 5D illustrate a rotating pin block 530 with specimen and hanger full-round pins 535A, 535B retained by corresponding set screws 540. FIGS. 5E-5G illustrate a rotating pin block 550 with specimen and hanger full-round pins 555A, 555B retained by corresponding screws 560A, 560B. In other embodiments of the present invention, the specimen and hanger full-round pins 535A, 535B, 555A, 555B include splines on the portions within the corresponding bodies 545, 565. Rotating pin blocks 530, 550 have the benefit that the corresponding specimen and hanger full-round pins 535A, 535B, 555A, 555B can be replaced as they wear, without the need to replace the entire rotating pin block 530, 550. In both rotating pin blocks 530, 550, the specimen and hanger full-round pins 535A, 535B, 555A, 555B are removably attached to their corresponding bodies 545, 565.

The half-round and full-round specimen and hanger pin diameters, pin type material and material grade, and their geometric configurations are preferably selected to ensure all portions of the rotating pin blocks behave elastically, which will be a function of at least the geometry of the DCB specimen and the shear strength of the two DCB specimen adherends.

DCB Testing

DCB testing in accordance with various embodiments of the present invention differs from traditional DCB testing under ASTM D5528-13 in several ways. These differences include the far faster turn-around time due to the lack of the labor and material intensive bonding of hinges or load blocks to the DCB specimen. These differences also include the internal application of the fracturing load to the DCB specimen via rotating pin blocks, which are coupled to the interior of the specimen, as opposed to the traditional external application of the fracturing load via hinges or load blocks, which are coupled to the exterior of the specimen. A further benefit to the internal application of the fracturing load is that it eliminates an additional potential point of fracture—the bond between the hinges or load blocks and the DCB specimen. Yet another benefit to the internal application of the fracturing load is the elimination of the need to generate one or more of the correction factors unique to hinges or loading blocks discussed in Annex A1 of ASTM D5528-13. These corrections required by the prior art, but not required by the present invention, are due to the shortening of the moment arm, the tilting of load blocks, and the stiffening of the DCB specimen due to the load blocks of the traditional DCB test.

Figure 6:
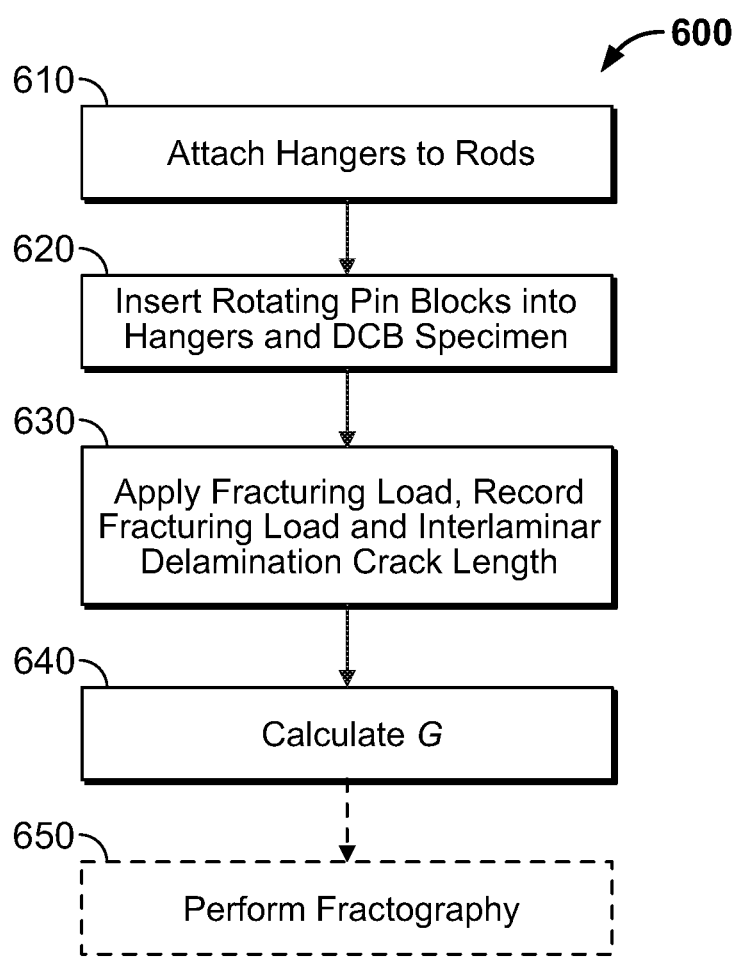
FIG. 6 illustrates a flowchart with the steps required to conduct a DCB Mode I fracture toughness test in accordance with one or more embodiments of the present invention.

FIG. 6 illustrates a flowchart 600 with the steps required to conduct a DCB Mode I fracture toughness test in accordance with at least one embodiment of the present invention. In step 610, the upper and lower pin block hangers are attached to respective upper and lower load rods. In step 620, the hanger full-round pin of each of the four rotating pin blocks are inserted into the corresponding upper and lower pin block hangers, while the specimen half-round pin of each of the four rotating pin blocks are inserted into the hole located in the DCB specimen. In step 630, a fracturing load is applied to the upper and lower load rods, while the applied fracturing load, P, and the interlaminar delamination crack length, a, are recorded as a function of time. In step 640, the strain energy release rate, G, of the DCB specimen is calculated using an appropriate, accepted approach. In optional step 650, fractography is performed to determine the mode of failure that governs the fracture toughness of the DCB specimen.

As will be appreciated, the order of the above steps may be altered, various steps may be combined, and one or more steps may be added or deleted depending upon the specific embodiment of the present invention. As will also be appreciated, the steps above may be altered when only two rotating pin blocks are employed, when fracture mode-mixity is being investigated and a simultaneous opening and shear loading is applied, or when the upper and lower rotating pin blocks each have specimen and hanger full-round pins and the DCB specimen has two holes.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method for conducting a Double Cantilever Beam (DCB) test comprising the steps of:
   providing upper and lower pin block hangers;
   providing at least two rotating pin blocks, each of the at least two rotating pin blocks including a specimen half-round pin and a hanger full-round pin, each specimen half-round pin substantially parallel to a corresponding hanger full-round pin;
   providing a DCB specimen having one hole therethrough;
   rotationally mechanically coupling each hanger full-round pin of each of the at least two rotating pin blocks to a corresponding one of the upper and lower pin block hangers;
   rotationally mechanically coupling each specimen half-round pin of each of the at least two rotating pin blocks to the DCB specimen via the one hole in the DCB specimen;
   applying a fracturing load to the DCB specimen via the at least two rotating pin blocks and the upper and lower pin block hangers;
   recording the applied fracturing load as a function of time;
   recording an interlaminar delamination crack length as a function of time; and
   calculating the strain energy release rate of the DCB specimen based upon the recorded applied fracturing load and the recorded interlaminar delamination crack length.

2. The method of claim 1, further comprising the step of performing fractography.

3. The method of claim 1, wherein a flat surface of a specimen half-round pin of a first of the at least two rotating pin blocks is adapted to face a corresponding flat surface of an opposing specimen half-round pin of a second of the at least two rotating pin blocks.

4. The method of claim 1,
   wherein the at least two rotating pin blocks includes four rotating pin blocks;
   wherein an end of a specimen half-round pin or a hanger full-round pin of each of the four rotating pin blocks includes a portion of an interlocking feature; and
   wherein the portion of the interlocking feature of a first of the four rotating pin blocks is adapted to fixedly mechanical couple with the portion of the interlocking feature of a second of the four rotating pin blocks.

5. The method of claim 4, wherein the interlocking feature includes one of a rod and corresponding recess, a tab and corresponding slot, and meshing teeth.

6. The method of claim 1, wherein each specimen half-round pin and each hanger full-round pin of each of the at least two rotating pin blocks is fixedly or removably attached to a body of a corresponding one of the at least two rotating pin blocks.

7. The method of claim 1,
   further comprising the step of preparing the DCB specimen, the step of preparing the DCB specimen including the steps of:
   locating the DCB specimen within a drill jig;
   aligning a drill with the DCB specimen at a predetermined position,
      the predetermined position being aligned with a laminar interface between first and second joined adherend layers that form the DCB specimen;
   drilling the one hole through the DCB specimen at the predetermined position.

\* \* \* \* \*